(12) United States Patent
Oliver et al.

(10) Patent No.: US 6,704,016 B1
(45) Date of Patent: Mar. 9, 2004

(54) METHOD AND APPARATUS FOR THE GRAPHICAL PRESENTATION OF SELECTED DATA

(75) Inventors: Peter I. Oliver, Falkirk (GB); Jonathan G. G. Tams, Edinburgh (GB)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/566,828

(22) Filed: May 8, 2000

(51) Int. Cl.$^7$ .............................. G06T 11/00; G06F 3/14
(52) U.S. Cl. .................... 345/440.2; 345/736; 345/771; 345/801; 345/784
(58) Field of Search ............................. 345/440.2, 440, 345/668, 667, 663, 736, 734, 737, 801, 800, 784, 781, 788, 771, 772, 970, 965

(56) References Cited

U.S. PATENT DOCUMENTS

| | | | | |
|---|---|---|---|---|
| 4,847,785 A | | 7/1989 | Stephens .................... 364/518 |
| 5,485,564 A | * | 1/1996 | Miura ......................... 345/440 |
| 5,636,350 A | * | 6/1997 | Eick et al. ................... 345/440 |
| 5,917,499 A | * | 6/1999 | Jancke et al. ................ 345/440 |
| 6,031,547 A | | 2/2000 | Kennedy ..................... 345/440 |
| 6,064,401 A | * | 5/2000 | Holzman et al. ............ 345/440 |
| 6,429,869 B1 | * | 8/2002 | Kamakura et al. ........ 345/440.2 |

* cited by examiner

Primary Examiner—Raymond J. Bayerl
(74) Attorney, Agent, or Firm—Michaelson & Associates; Peter L. Michaelson; Janet M. Skafar (57) ABSTRACT

A method graphically presents a selected group of data values of a series of data values in a predetermined presentation area. The largest data value within the selected group of data values is determined. A scaling factor for the determined largest data value to correspond with a lateral dimension of the presentation area is determined. The determined scaling factor is applied to all the data values in the group of data values. The scaled group of data values within the presentation area is graphically presented. Advantageously, the graphical presentation of the data values is scaled according to the data presented in the presentation area, thus maximizing the detail shown in the graphical representation. The method is preferably implemented in the form of a computer program.

24 Claims, 5 Drawing Sheets

METHOD AND APPARATUS FOR THE GRAPHICAL PRESENTATION OF SELECTED DATA

BACKGROUND OF THE INVENTION

1. Field of the Invention

The present invention relates to an apparatus and method for the presentation of data in graphical form and more particularly to the scaling of graphical representations of selected data from a series of data.

2. Description of the Related Art

A common data analysis task is to graphically present a series of numerical data associated with a particular concept. The concept may or may not be directly related to a physical object. The data may be displayed on a computer display screen (or alternatively printed) in the form of a "bar chart" where each bar represents data associated with an object e.g. a physical device, and the length of each "bar" represents the numerical value for the data. For example, in network management, a numerical data series representing the concept of the quantity of data packets sent and received by devices on the network may be displayed in the bar chart, where each bar represents a particular network device and the length of each bar represents the quantity of data packets sent and received by the device.

Sometimes there are a group of concepts, associated with the same objects, each with their own associated data series. The concepts may be related and the numerical data values may be expressed in the same unit. Thus, the data for the group of concepts might conveniently be displayed in the same bar chart. It is a common technique to display related groups of data for a particular object in a single bar with a number of ordered and proportionally sized related segments—each segment representing a different datum from the group. This is known as a "stacked bar". A stacked bar chart displays a plurality of these stacked bars with each stacked bar representing data relating to an object such as a physical device. Often the stacked bars are presented in the bar chart in a particular order. For instance, the bars may be ordered by the sum of the data values for all the data groups from largest to smallest, i.e. ordered by the length of the stacked bars from longest to shortest.

One example of the use of stacked bar charts is in network management in which numerical data relating to a group of concepts, such as the quantity of data packets using different protocols sent and received from devices on the network, may be conveniently displayed together in a single stacked bar chart. In such an example, each bar relates to a particular network device, each segment of a bar represents the quantity of data sent and received by the device using a particular network protocol, and the sum of the segments represents the total quantity of data packets sent and received by the device.

Figure 1:
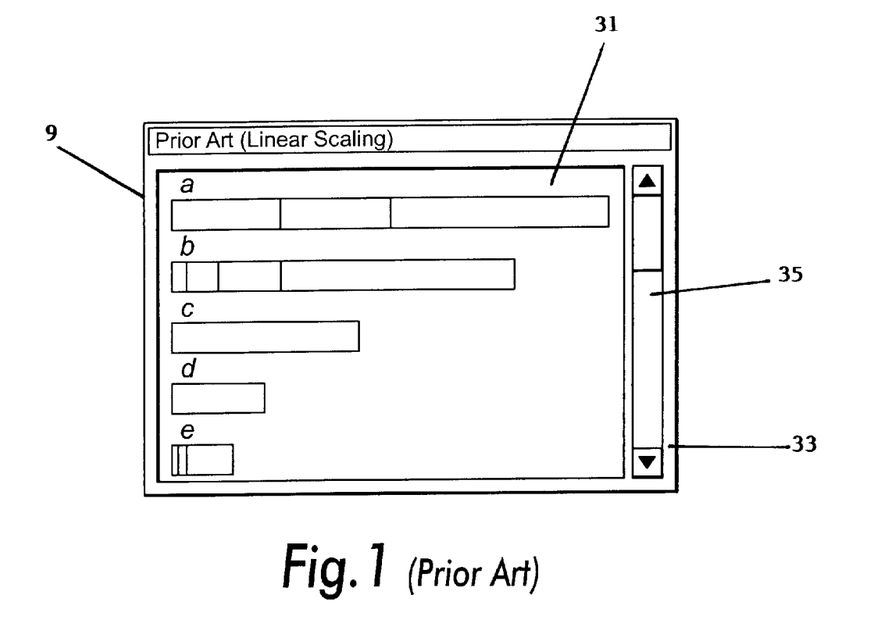
FIG. 1 shows a top portion of a stacked bar chart employing linear scaling in accordance with a prior art method.

FIG. 1 shows an example of such a stacked bar chart used in network management as described above. The bar chart is displayed in a "window" on a computer display screen. The stacked bars are displayed as an ordered series of horizontally extending bars with the top bar representing the device having the largest number of associated data packets and the bottom bar representing the device having the smallest number of data packets associated with it. It will be noted that every bar in the chart is represented using the same, linear scale along its length, i.e. across the width of the window. The length of the topmost bar is scaled to occupy the full width of the window, leaving appropriate margins, and the remaining bars are represented according to the same scaling factor. Since the scale is linear, segments of the bars having the same length represent the same quantitative data value.

A problem with presenting bar charts as an ordered series of bars having the same linear scale is that if there is a large number of data values represented in the chart, and a large variation in numerical data values in the data series, the bars relating to the smaller numerical values may be rendered too small to distinguish each of the stacked segments on the display.

Figure 2:
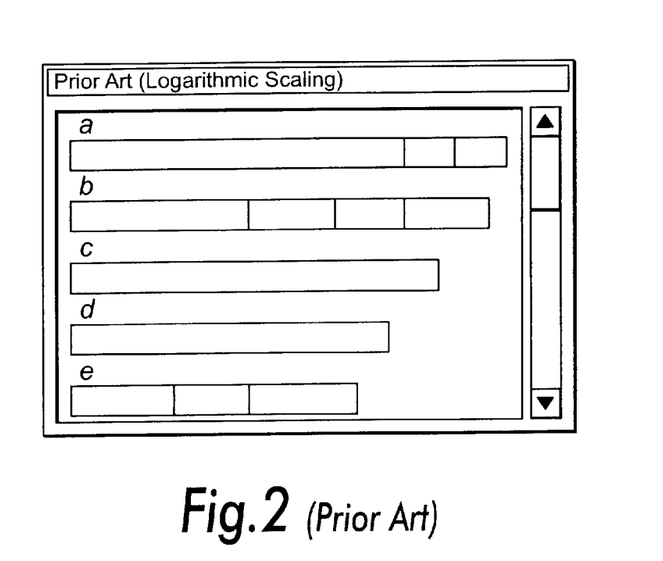
FIG. 2 shows the data of the top portion of the stacked bar chart of FIG. 1 represented in a stacked bar chart employing logarithmic scaling in accordance with a prior art method.

A known solution to this problem is to employ "logarithmic scaling". In this method, the numerical data values are presented in a bar having a logarithmic scale along its length. FIG. 2 shows the numerical data values represented in the linearly scaled bar chart of FIG. 1 presented in a logarithmically scaled bar chart. As can be seen from FIG. 2, logarithmic scaling gives increased space for representing data at the low end of the scale (in FIG. 2 the left hand side). This means that data at the low end of the scale is presented in greater detail than data at the high end of the scale. Thus the smaller bars, at the bottom of the chart of FIG. 2, occupy more space than they occupied using linear scaling as in FIG. 1. Consequently, the segments of these smaller stacked bars can be visually identified since they are presented in more detail, thus overcoming the aforementioned problems associated with linear scaling.

However, logarithmic scaling has a number of disadvantages. Firstly, the sizes of the bars and individual segments are no longer linearly related. In particular, because the scale is logarithmic, two adjacent segments of the same length in the same bar do not equate to the same numerical quantity (e.g. number of data packets) and so the viewer has more difficulty in comparing relative values associated with segments in the same bar. In addition, for large bars, segments representing relatively large data quantities at the high end of the scale are shown closer together and are therefore no longer visibly distinguished. This is because large data values at the high end of the logarithmic scale are represented by short segments. Finally, since in most uses, large data values are considered to be more significant than smaller values, associating large bars with relatively small data quantities may be confusing to the viewer.

The present invention seeks to overcome the disadvantages of these prior art methods.

SUMMARY OF THE INVENTION

In accordance with a first aspect, the present invention provides a method for graphically presenting a selected set of data values of a series of data values in a predetermined presentation area, the method comprising: determining the largest data value within the selected set of data values; determining a scaling factor for scaling the determined largest data value to a lateral dimension of the presentation area; applying the determined scaling factor to all the data values in the set of data values to provide a scaled set of data values, and graphically presenting the scaled set of data values within the presentation area.

Thus, the present invention provides a method by which the bars can be dynamically scaled as a result of selection of a set of data values by the user so as to make the best and most informative use of the display space available for the chart.

In accordance with a second aspect, the present invention provides a computer program for carrying out the method in accordance with the first aspect of the present invention.

BRIEF DESCRIPTION OF THE DRAWINGS

Embodiments of the present invention will now be described, by way of example, with reference to the accompanying drawings, in which.

DESCRIPTION OF THE PREFERRED EMBODIMENTS

Figure 4:
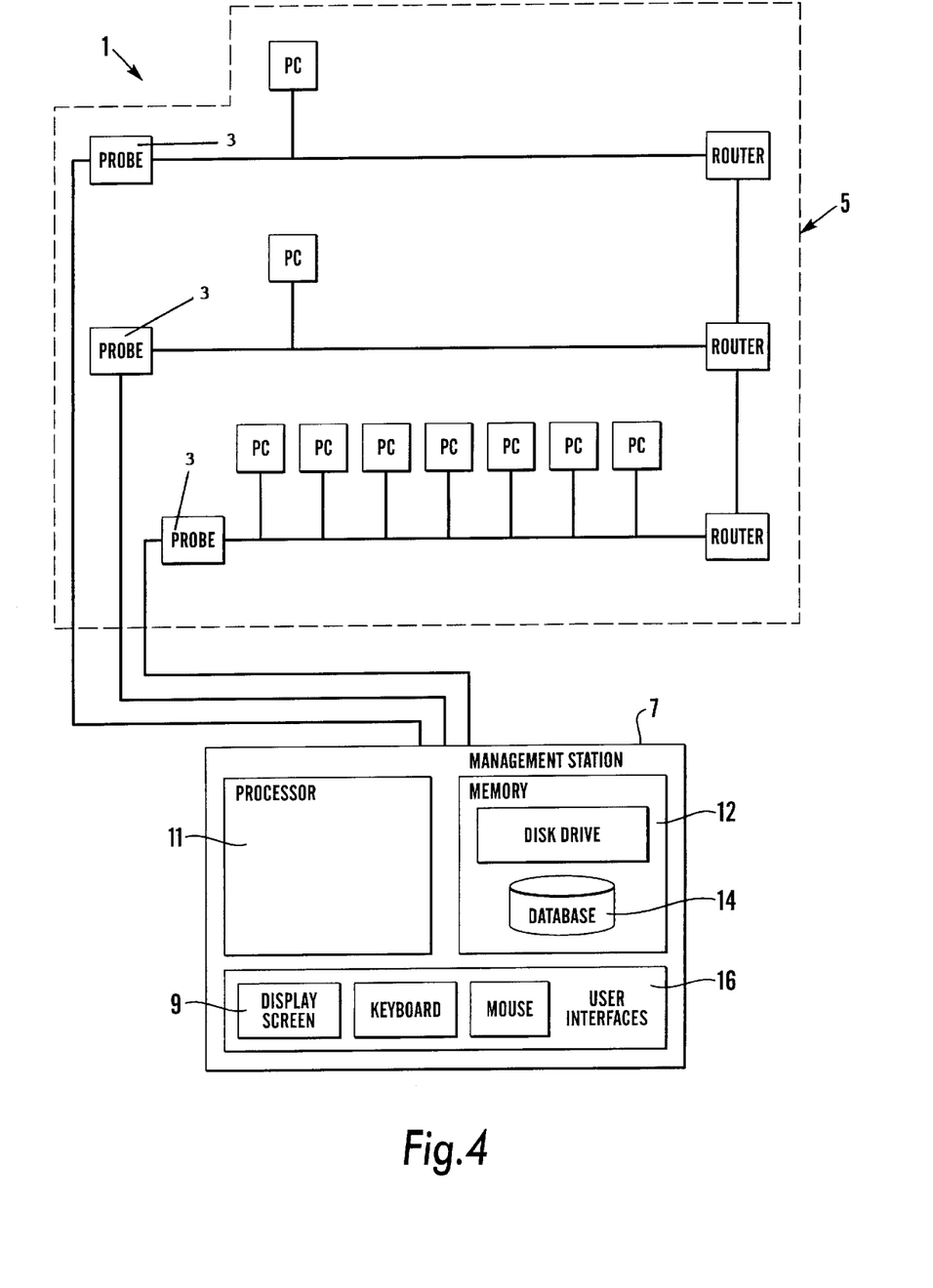
FIG. 4 is a block diagram showing a network management system in accordance with a preferred embodiment of the present invention.

FIG. 4 illustrates a network management system 1 comprising a computer network 5 having a network management station 7. The network management station 7 is typically a conventional computer having a processor 11, memory 12 including a disk drive, and a database 14 for network management data. The network management station 7 includes network management software which retrieves data from inter alia network traffic monitors or probes 3, and stores the retrieved data in the database 14. Probes 3 are strategically located on the network 5 to monitor data traffic on the network and collect management data relating to the monitored data traffic, such as RMON data, as is well known in the art. The retrieval and storage of data is achieved using conventional methods, such as those disclosed in UK Patent Application GB-A-2 337 903 which is herein incorporated by reference. The network management station 7 further includes user interfaces 16 including a display screen 9, a keyboard and a mouse.

FIG. 1 shows a stacked bar chart 31 having a linear scale displayed in a window 33 of a display screen 9 of network management station 7 produced in accordance with a prior art method. The window 33 has a scroll bar 35 to enable the user to scroll up and down the bar chart to reveal selected areas of the bar chart 31. FIG. 1 shows the top five bars a to e representing the five largest numerical values of the bar chart 31. The largest bar a represents the largest numerical value (which may be the sum of numerical sub values) in the data series represented in the bar chart. In accordance with a preferred embodiment, the bar a represents data for the monitored network device having the largest data volume associated with it, and the numerical values and sub values represent the quantity of data associated with traffic involving the device. As can be seen from FIG. 1, the bar a is dimensioned to occupy the full width of the window, with margins either side. This ensures that the level of detail shown in the bar is maximised so that the segments of the bar can be readily distinguished.

Figure 3:
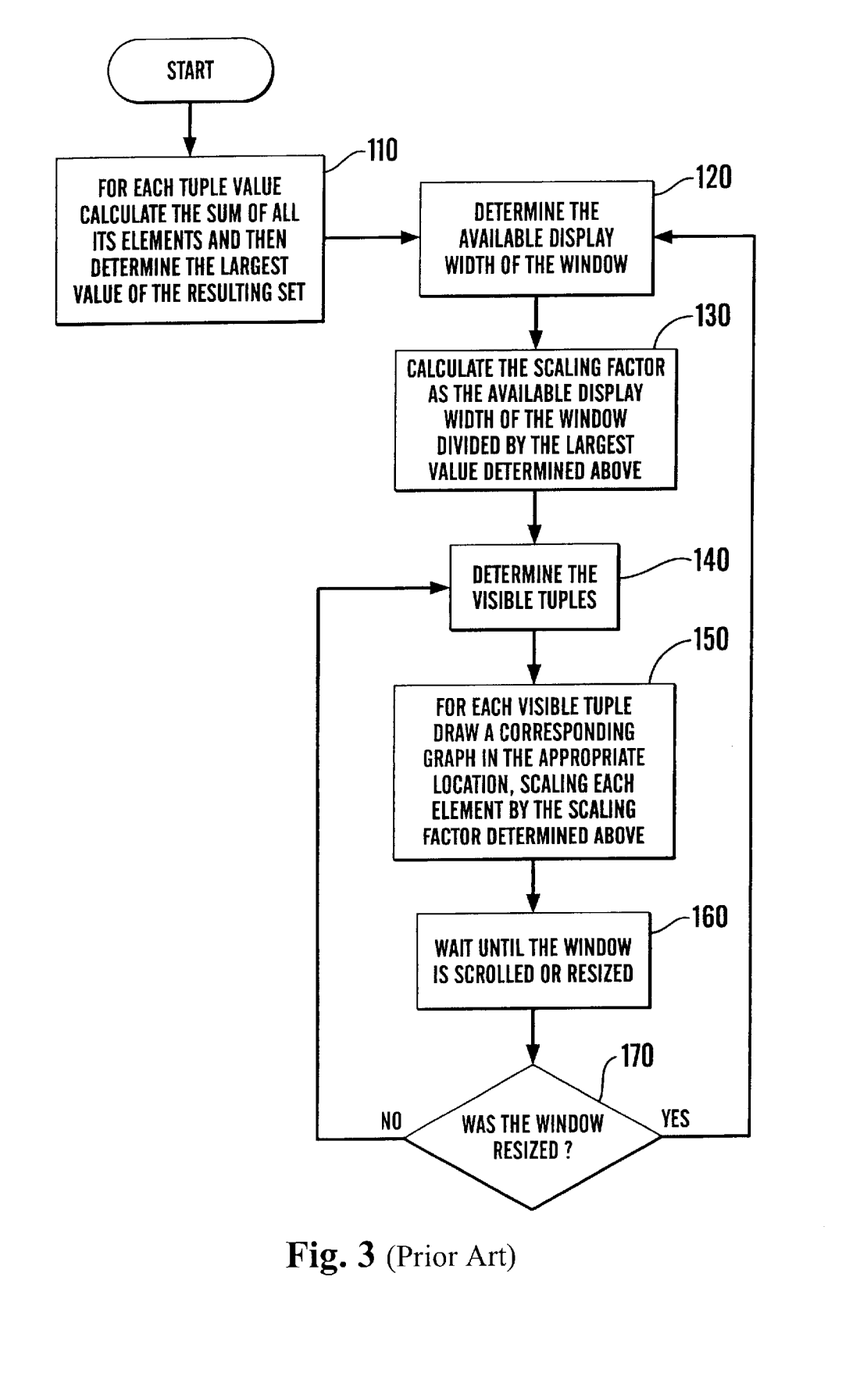
FIG. 3 is a flow diagram of a sequence of program steps for producing a bar chart representing data on a computer display screen in accordance with a prior art method.

FIG. 3 shows the prior art method steps implemented in a computer program used to produce the bar chart of FIG. 1.

The program starts upon receiving a group of data series having related numerical data values for data traffic associated with a plurality of network devices, which data needs to be presented in the form of a stacked bar chart.

The data associated with each network device will be referred to as a "tuple" or data value. Each tuple has a group of elements (or a group of sub-values) having numerical data values associated with corresponding groups of concepts. In the example, the group of concepts are different network protocols, and the tuple elements represent the data traffic associated with a network device using a particular network protocol.

At step 110, the program determines the sum of the tuple elements for each tuple and determines which tuple has the largest sum. This tuple will then be represented by the largest bar in the bar chart, and the scaling factor for the data values and sub values is determined accordingly.

At step 120, the program determines the available width of the display area or "window" 33 of the display screen 9.

At step 130, the program calculates the scaling factor to be used to represent the bars in the bar chart. The scaling factor is calculated to be the width determined in step 120 divided by the value of the largest tuple as determined in step 110.

At step 140, the program determines which of the tuples will be displayed in the window 33 of the display screen 9. This is achieved using the mathematical formulae and processes described below.

At step 150 the program generates a graphical bar for each of the tuples, in each case scaling the elements of the tuple by multiplying the element or data sub value by the scaling factor determined in step 130, and displays the thus generated bars on a bar chart in the window 33.

The program then waits at step 160, until there is a change in the selected tuples for display in the window by scrolling the scroll bar 35, or a change in the size of the window 33.

At step 170, the program determines if the change included a change in the size of the window 33. If the size of the window has changed, the program returns to step 120 to redetermine the width of the window before determining the new scaling factor. If the size of the window 33 has not changed, the program returns to step 140.

As discussed above, this method leads to the problem that where there is a large variation amongst the numerical values for the tuples (i.e. the sums of tuple elements) in the series, small tuples will be graphically represented in very small bars and the individual elements within such small bars will not be visually distinguishable.

Figure 5:
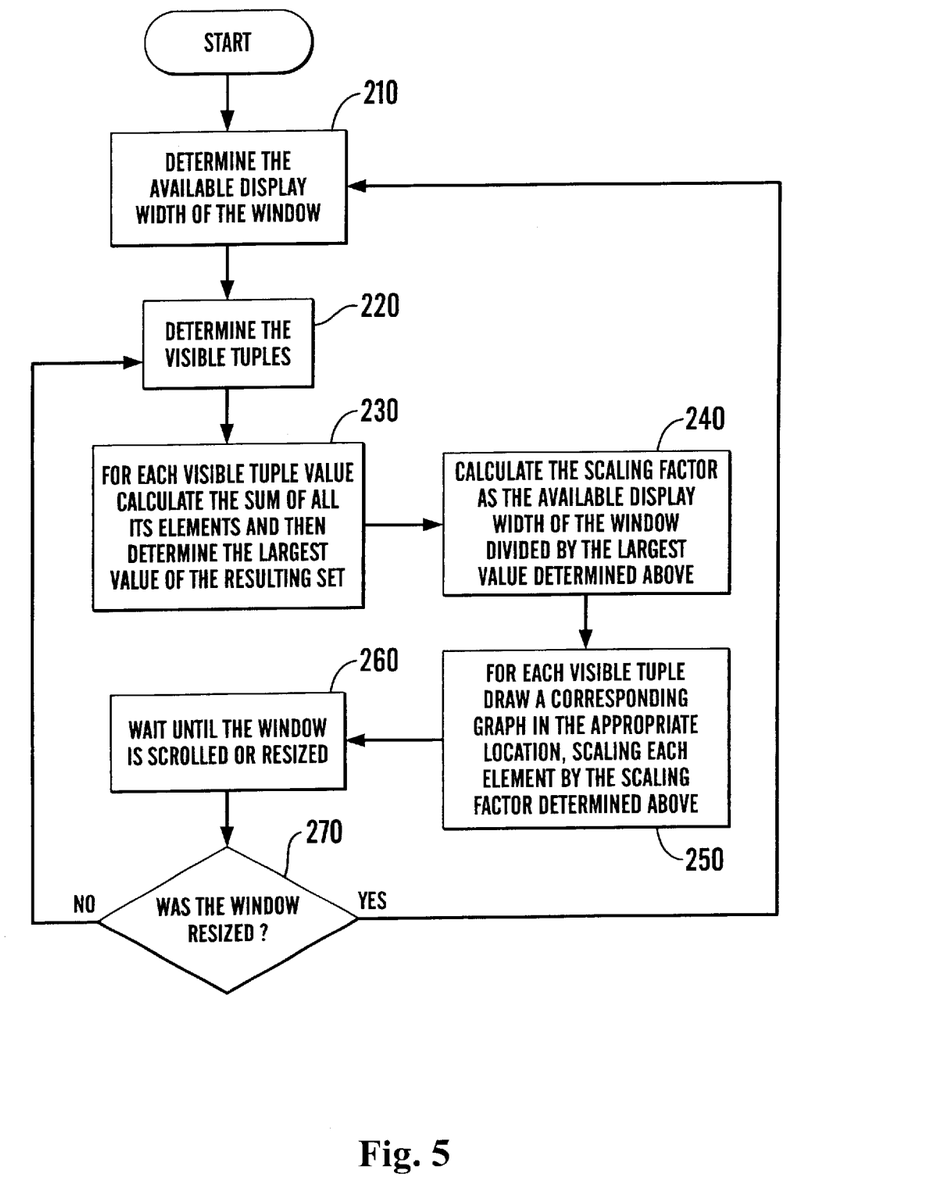
FIG. 5 is a flow diagram of a sequence of program steps for producing a bar chart representing data on a computer display screen in accordance with a preferred embodiment of the present invention.

In order to overcome this problem, FIG. 5 illustrates a method in accordance with a preferred embodiment of the present invention. In accordance with the preferred embodiment, the method is implemented in the form of a computer program run on a network management station 7. The computer program steps as illustrated by FIG. 5 dynamically adjust the scaling factor applied to represent the data values according to the largest tuple visible within the display window 33. More specifically, each time the window 33 is scrolled, a new set of tuple values are effectively selected for display within the window 33, and the program performs a calculation to determine the appropriate scaling factor for the tuples displayed in the window.

As with the program of FIG. 3, the program of FIG. 5 starts upon receiving the tuples having a plurality of tuple elements, which data needs to be presented in the form of a stacked bar chart.

Figure 6:
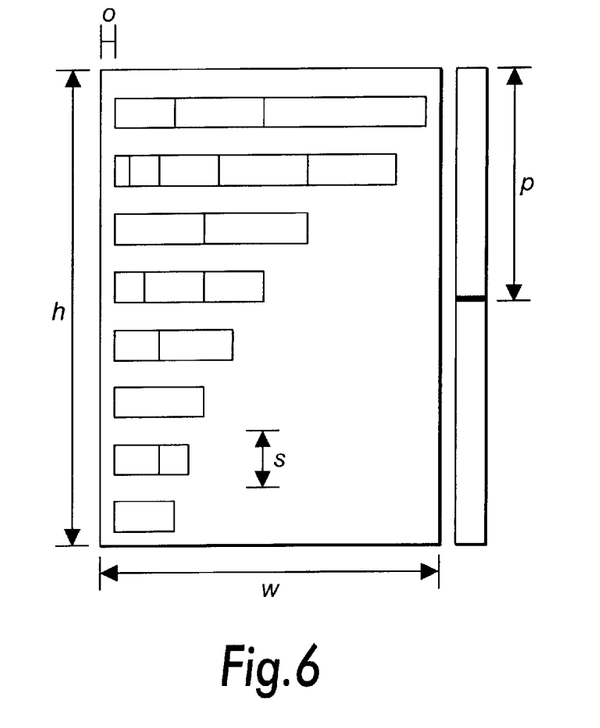
FIG. 6 is a schematic illustration of the parameters used in the graphical presentation of data in accordance with the present invention.

At step 210, the program determines the available width of the display area or "window" 33 of the display screen 9. This is determined using the formula:

$$(w-(2o))$$

where w is the width of the window and o is the width of margin on both the left hand side and the right hand side (see FIG. 6).

At step 220 the program determines which of the tuples will be displayed in the window 33 of the display screen 9. This is achieved using the same mathematical process as step 140 of the program of FIG. 3 and described in more detail below.

At step 230 the program determines the sum of the tuple elements for each tuple and determines which tuple has the largest sum. Thus for a selected group of tuples i to be displayed in the window 3, each tuple i having elements j, each tuple i having $m_i$ elements, and each element having a value $x_{ij}$, the program determines the tuple with the largest sum using the formula:

$$\text{Max}\left[\sum_{j=1}^{m_i} x_{ij} \text{ for the selected range of tuples } i\right]$$

where $$\sum_{j=1}^{m_i} x_{ij}$$

is the sum of all the elements or sub-values j (where $1 \leq j \leq m_i$) for a particular tuple i.

The tuple determined using this formula will then be represented by the largest bar of the bar chart in the window 33.

At step 240, the program determines the scaling factor based upon the tuple having the largest sum as determined in step 230. This scaling factor is the width determined in step 210 divided by the sum of the tuple elements of the largest tuple determined in step 230. The scaling factor is thus determined using formula:

$$\frac{(w-(2o))}{\text{Max}\left[\sum_{j=1}^{m_i} x_{ij} \text{ for the selected range of tuples } i\right]}$$

At step 250, the program calculates the length of each element for each tuple, for representation in the graphical bar, by multiplying the element by the scaling factor. Thus for each tuple element $x_{ij}$ of each tuple i, the length of the corresponding segment of the bar is calculated using the formula:

$$\frac{x_{ij}(w-(2o))}{\text{Max}\left[\sum_{j=1}^{m_i} x_{ij} \text{ for the selected range of tuples } i\right]}$$

The program thus generates a graphical bar for each of the tuples and displays the bars on a bar chart in the window 33.

At step 260, the program waits until a change to the window is necessary, for instance the window 33 may be scrolled or resized. At step 270, the program determines if the change included a change in the size of the window 33. If the size of the window has changes, the program returns to step 210 to redetermine the width of the window before determining the new scaling factor. If the size of the window has not changed, the program returns to step 220. The program then continues by determining the new largest tuple, and therefore the new scaling factor for use in displaying the bar chart.

Thus, the steps employed in accordance with the preferred embodiment of the present invention have the advantage of scaling the bar chart dynamically according to the data selected for display in the window 33 for instance by scrolling the scrollbar.

The determination of which of the tuples i will be displayed in the window 33 of the display screen 3 in step 140 of the program of FIG. 3 or step 220 of the program of FIG. 5 is determined using the position of the scroll bar 35.

This calculation involves the following parameters which are shown in FIG. 6.

h is the height of the window 33 p is the position of the scroll bar as an offset from the top of the window n is the number of tuples or data values to be displayed in the window s is the height of each stacked bar, including associated blank area above and below the bar.

In this calculation, it is assumed that the tuples i are ordered by numerical data size so that the $1^{st}$ tuple (i=1) is the largest tuple and the nth tuple (i=n) is the smallest tuple.

The start of the visible area of the vertically scrollable window, as shown in FIG. 6, is calculated as:

$$\left(\frac{p}{h}((n \times s) - h)\right)$$

The first visible bar is therefore calculated using the formula:

$$i = \left|\frac{\left(\frac{p}{h}((n \times s) - h)\right)}{s}\right| + 1$$

and the last visible bar is calculated using the formula;

$$i = \left|\frac{\left(\left(\frac{p}{h}((n \times s) - h)\right) + h\right)}{s}\right|$$

Thus, in accordance with the present invention as shown in FIG. 5, the selected range of tuples i are those numbered between and including the values for i calculated using the above formulae.

Figure 7:
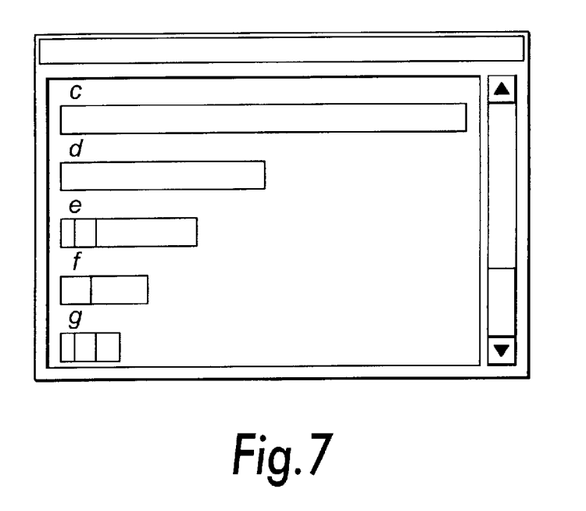
FIG. 7 shows the data of a middle portion of the stacked bar chart of FIG. 1 represented in a stacked bar chart produced in accordance with the method of the preferred embodiment of the present invention.

FIG. 7 shows a portion of the data represented in the stacked bar chart of FIG. 1 represented in a stacked bar chart scaled in accordance with the present invention. In particular, FIG. 7 shows a window of a display screen illustrating a stacked bar chart. The scroll bar of the window is scrolled to select bars representing the data of bars c to g of the bar chart of FIG. 1 (of which the data for bars f and g is not shown in FIG. 1). The selected bars are scaled using a scaling factor so that the bar representing the largest data value, bar c, occupies the full width of the window, as described above.

As can be seen from FIG. 7, the segments of the bar e are clearly visible when scaled in accordance with the present invention in comparison to the scaling used in FIG. 1, and the linear scale allows comparison of segments within each bar, thus avoiding the problems associated with logarithmic scaling used in FIG. 2.

Whilst the bar charts have been illustrated with individual bars extending horizontally, and the scrollbar thus extending vertically, it will be appreciated that the bar chart can be presented in other orientations. For example, the bars in the bar chart could extend vertically.

It will be appreciated that whilst the illustrated bar charts show the bars ordered according to size, the method of the present invention can be employed for presenting selected data in any other order. However, the advantages of the invention are more apparent to the user where the selected data have values within a relatively small range of data values.

It will further be appreciated that whilst linear scaling is preferably employed, other scaling methods may be used according to the range of values of the data selected for display.

The method of the present invention has been described as implemented in the form of a computer program, but may equally be carried out by other means, for example in hardware. When implemented in software, the program may be carried on a computer readable medium Such computer readable medium may be a disk which can be loaded in the disk drive of a network management station computer, or may be the computer system carrying a website which permits downloading of the program over the Internet by a network management station. Thus, the present invention may be embodied in the form of a carrier wave with the computer program carried thereon Whilst the present invention has been described in the context of presenting network management data, it will be appreciated that the present invention may be used in any field which requires the graphical presentation of large quantities of data values.

As the skilled person will appreciate, many variations and modifications can be made to the described embodiments. It is intended to include all such variations, modifications and equivalents which fall within the spirit and scope of the present invention as defined in the accompanying claims.

What is claimed is:

1. A method for graphically presenting a selected set of data values of a series of data values, in a predetermined presentation area on a display screen, said presentation area graphically presenting an existing set of said data values scaled using an existing scaling factor, the method comprising:

receiving a selection of a new set of said data values by a user scrolling a scrollbar associated with the presentation area, and, in response thereto, determining a new largest data value within the selected new set of data values;

determining a new scaling factor for scaling the determined new largest data value to a lateral dimension of the presentation area;

applying the determined new scaling factor to all the data values in the selected new set of data values to provide a new scaled set of data values, and graphically presenting the new scaled set of data values within the presentation area on the display screen.

2. A method as claimed in claim 1, wherein each data value consists of one or more data sub values, wherein the step of applying comprises applying said determined new scaling factor to each sub value within each data value in the selected new set of data values to provide a plurality of scaled sub values within each scaled data value in the new scaled set of data values, and the step of presenting comprises graphically presenting the plurality of scaled sub values in presenting the new scaled set of data values.

3. A method as claimed in claim 2, wherein the new selected set of data values is the group of data values selected for display in a window forming the presentation area on the display screen by said scrolling.

4. A method as claimed in claim 2, wherein each data value is presented as a stacked bar in a bar chart, wherein each sub value of a data value is represented as a segment of the corresponding stacked bar.

5. A method as claimed in claim 4, wherein the step of determining a new scaling factor comprises the steps of: determining the lateral dimension of the presentation area for display of the bar chart; determining the new largest data value in the new selected set of data values, and calculating the new scaling factor by dividing the lateral dimension by the new largest data value.

6. A method as claimed in claim 5, wherein each bar in the bar chart is presented extending horizontally, and wherein the step of determining the lateral dimension uses the formula:

$$w-(2o)$$

where w is the width of the window, and o is the width of each margin.

7. A method as claimed in claim 6, wherein the step of determining the new largest data value uses the formula:

$$\max\left[\sum_{j=1}^{m_i} x_{ij} \text{ for the selected range of data values } i\right]$$

where $$\sum_{j=1}^{m_i} x_{ij}$$

is the sum of all the data sub values $x_{ij}$ for a particular data value i having $m_i$ data sub values.

8. A method as claimed in claim 7, wherein the step of determining new the scaling factor uses the formula:

$$\frac{x_{ij}(w-(2o))}{\max\left[\sum_{j=1}^{m_i} x_{ij} \text{ for the selected range of data values } i\right]}.$$

9. A method as claimed in claim 8, further comprising the step of: determining the new selected set of data values i as the values for i in the range:

$$\left(\left|\frac{\left(\frac{p}{h}((n\times s)-h)\right)}{s}\right|+1\right) \le i \le \left(\left|\frac{\left(\left(\frac{p}{h}((n\times s)-h)\right)+h\right)}{s}\right|\right),$$

where: h is the height of the window p is the position of the scroll bar as an offset from the top of the window n is the number of data values to be displayed in the window s is the height of each stacked bar, including associated blank area above and below the bar.

10. A method as claimed in claim 2, wherein the step of applying the new scaling factor comprises the step of: multiplying each data sub value by the new scaling factor.

11. A method as claimed in claim 2, wherein the scaling is linear.

12. A method as claimed in claim 1, wherein the new selected set of data values is the group of data values selected for display in a window forming the presentation area on the display screen by said scrolling.

13. A method as claimed in claim 1, wherein each data value is presented as a bar in a bar chart.

14. A method as claimed in claim 13, wherein the step of determining a new scaling factor comprises the steps of: determining the lateral dimension of the presentation area for display of the bar chart; determining the new largest data value in the new selected set of data values, and calculating the new scaling factor by dividing the lateral dimension by the new largest data value.

15. A method as claimed in claim 14, wherein the step of determining the new largest data value uses the formula:

$$\max \left[ \sum_{j=1}^{m_i} x_{ij} \text{ for the selected range of data values } i \right]$$

where $$\sum_{j=1}^{m_i} x_{ij}$$

is the sum of all the data sub values $x_{ij}$ for a particular data value i having $m_i$ data sub values.

16. A method as claimed in claim 14, wherein the step of determining the new scaling factor uses the formula:

$$\frac{x_{ij}(w - (2o))}{\max \left[ \sum_{j=1}^{m_i} x_{ij} \text{ for the selected range of data values } i \right]}.$$

17. A method as claimed in claim 16, further comprising the step of: determining the new selected set of data values i as the values for i in the range:

$$\left( \left| \frac{\left( \frac{p}{h}((n \times s) - h) \right)}{s} \right| + 1 \right) \leq i \leq \left( \left| \frac{\left( \left( \frac{p}{h}((n \times s) - h) \right) + h \right)}{s} \right| \right),$$

where: h is the height of the window p is the position of the scroll bar as an offset from the top of the window n is the number of data values to be displayed in the window s is the height of each stacked bar, including associated blank area above and below the bar.

18. A method as claimed in claim 13, wherein each bar in the bar chart is presented extending horizontally, and wherein the step of determining the lateral dimension uses the formula:

$$w - (2o)$$

where w is the width of the window, and o is the width of each margin.

19. A method as claimed in claim 1, wherein the scaling is linear.

20. The method as claimed in claim 1 wherein the new set of data values has at least one value not belonging to the existing set of data values.

21. A computer readable medium carrying a computer program for use in graphically presenting a selected set of data values of a series of data values in a predetermined presentation area on a display screen, said presentation area graphically presenting an existing set of said data values scaled using an existing scaling factor, the program comprising:

a program step for receiving a selection of a new set of said data values in response to a user scrolling a scrollbar associated with the presentation area;

a program step for determining a new largest data value within the new selected set of data values;

a program step for determining a new scaling factor for scaling the determined new largest data value to a lateral dimension of the presentation area;

a program step for applying the determined new scaling factor to all the data values in the new selected set of data values to provide a new scaled set of data values, and a program step for graphically presenting the new scaled set of data values within the presentation area on the display screen.

22. A computer readable medium carrying a computer program as claimed in claim 21, wherein each data value consists of one or more data sub values, wherein:

the program step for applying the determined new scaling factor comprises a program step for applying said determined new scaling factor to each sub value within each data value in the set of data values to provide a plurality of scaled sub values within each scaled data value in the scaled set of data values, and the program step for presenting comprises a program step for graphically presenting the plurality of scaled sub values in presenting the new scaled set of data values.

23. A computer readable medium carrying a computer program as claimed in claim 21, wherein:

the program step for determining a new scaling factor comprises a program step for: determining the lateral dimension of the presentation area available for display of the graphical representation; a program step for determining the new largest data value in the new selected set of data values, and a program step for calculating the new scaling factor by dividing the determined lateral dimension by the determined new largest data value.

24. A network management apparatus comprising a network management station, wherein the network management station includes a processor, memory, a display screen and a user operated interface;

at least one network traffic monitor; and a plurality of network devices;

wherein the processor is configured to receive data from said at least one traffic monitor, to process the data, and to graphically present a set of data values of a series of data values, in a predetermined presentation area on the display screen, according to an existing scaling factor;

wherein the processor is further configured to receive a selection of a new set of data values for presentation in said presentation area, in response to a user scrolling a scrollbar associated with the presentation area on the display screen using the user operated interface, and, in response thereto, to determine the new largest selected data value, and to determine a new scaling factor for scaling the determined new largest selected data value to a lateral dimension of the area of the display screen, the processor being further configured to apply the new scaling factor to all the new selected data values and to graphically present the resulting new scaled set of data values in the presentation area of the display screen.

* * * * *